United States Patent
Klutinus et al.

(10) Patent No.: US 12,142,776 B2
(45) Date of Patent: Nov. 12, 2024

(54) BATTERY FOR A MOTOR VEHICLE

(71) Applicant: Dr. Ing. h.c. F. Porsche Aktiengesellschaft, Stuttgart (DE)

(72) Inventors: Rüdiger Klutinus, Pforzheim (DE); Dominik Grass, Bietigheim-Bissingen (DE); Christian Wendland, Grafenau (DE); Martin Kinscher, Loechgau (DE); Jens Maurer, Renningen (DE); Tim Schmidt, Freiberg am Neckar (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 127 days.

(21) Appl. No.: 17/374,289

(22) Filed: Jul. 13, 2021

(65) Prior Publication Data

US 2022/0029234 A1    Jan. 27, 2022

(30) Foreign Application Priority Data

Jul. 21, 2020  (DE) ............... 10 2020 119 107.3

(51) Int. Cl.
*H01M 50/198*  (2021.01)
*H01M 10/04*   (2006.01)
(Continued)

(52) U.S. Cl.
CPC ......... *H01M 50/198* (2021.01); *H01M 10/04* (2013.01); *H01M 10/441* (2013.01);
(Continued)

(58) Field of Classification Search
CPC ............. H01M 50/198; H01M 50/209; H01M 50/291; H01M 50/233; H01M 10/04; H01M 10/441; H01M 2220/20
(Continued)

(56) References Cited

U.S. PATENT DOCUMENTS

| | | | |
|---|---|---|---|
| 9,484,592 B2 * | 11/2016 | Roh | ............... H01M 10/647 |
| 2016/0149210 A1 * | 5/2016 | Yoo | ................. H01M 4/366 |
| | | | 429/231.95 |
| 2021/0036298 A1 | 2/2021 | Kambayashi et al. | |

FOREIGN PATENT DOCUMENTS

| | | | | |
|---|---|---|---|---|
| CN | 100539248 C | * | 9/2009 | ............. B60L 1/003 |
| CN | 203046857 U | | 7/2013 | |

(Continued)

*Primary Examiner* — Matthew T Martin
*Assistant Examiner* — Paul Christian St Wyrough
(74) *Attorney, Agent, or Firm* — Buchanan Ingersoll & Rooney PC

(57) ABSTRACT

A battery for a motor vehicle includes a plurality of battery cells and a housing. The battery cells are arranged within the housing and designed for storing energy and discharging electrical energy. The housing includes at least a first housing element and a second housing element. The first housing element and the second housing element are fixedly connected to each other. The first housing element and the second housing element each include a base surface and two lateral surfaces. The base surface is arranged between the lateral surfaces. A first distance by which the lateral surfaces extends away from the base surface is greater than a second distance by which the lateral surfaces are spaced apart from each other. The base surface and the lateral surfaces of the first housing element have the same dimensions as the base surface and the lateral surfaces of the second housing element.

22 Claims, 2 Drawing Sheets

(51) Int. Cl.
*H01M 10/44* (2006.01)
*H01M 50/209* (2021.01)
*H01M 50/233* (2021.01)
*H01M 50/291* (2021.01)

(52) U.S. Cl.
CPC ....... *H01M 50/209* (2021.01); *H01M 50/233* (2021.01); *H01M 50/291* (2021.01); *H01M 2220/20* (2013.01)

(58) Field of Classification Search
USPC .......................................................... 429/163
See application file for complete search history.

(56) References Cited

FOREIGN PATENT DOCUMENTS

| | | | |
|---|---|---|---|
| DE | 102014217523 A1 | 3/2016 | |
| DE | 102016219993 A1 | 4/2018 | |
| DE | 112019000628 A1 | 10/2020 | |
| EP | 2838133 A1 | 2/2015 | |
| JP | 2008066000 A * | 3/2008 | |
| JP | 2016143662 A * | 8/2016 | .......... H01M 50/147 |

\* cited by examiner

BATTERY FOR A MOTOR VEHICLE

CROSS-REFERENCE TO RELATED APPLICATION

This application claims priority to German Patent Application No. 10 2020 119 107.3, Jul. 21, 2020, the content of such application being incorporated by reference herein in its entirety.

FIELD OF THE INVENTION

The present invention relates to a battery for a motor vehicle.

BACKGROUND OF THE INVENTION

Motor vehicles with an electric drive are becoming ever more popular and important in particular for environmental protection reasons. In this connection, the batteries used in these motor vehicles are of particularly high importance in addition to the drive.

A battery conventionally comprises a plurality of battery cells which are arranged in a housing. In the case of what are referred to as pouch cells, the battery cells are compressed by foam pads.

DE 10 2016 219 993 A1, which is incorporated by reference herein, discloses a housing of a battery module with a housing element having four side walls and a bottom surface. The housing element has an opening at the top for introducing a plurality of battery cells, the opening being closed with a cover element.

SUMMARY OF THE INVENTION

By contrast, the present invention relates to permitting better compression of the battery cells.

The battery comprises a plurality of battery cells and a housing. The battery cells are designed for storing energy and are designed for discharging electrical energy. The battery cells are arranged within the housing. The housing comprises at least a first and a second housing element. The first and the second housing element are fixedly connected to each other. Within the scope of this description, a fixed connection is understood as meaning in particular that the connection cannot be released without a tool. The fixed connection can be, for example, an adhesive connection.

The first and the second housing element each comprise a base surface and two lateral surfaces. The base surface is in each case arranged between the lateral surfaces. The lateral surfaces can be arranged in each case in particular at mutually opposite end regions of the base surface. The lateral surfaces can in each case extend in particular parallel to each other.

A first distance by which the lateral surfaces extend away from the base surface can be greater than a second distance by which the lateral surfaces are spaced apart from each other. In this case, the first and the second housing element can in each case have a U-shaped cross-sectional shape.

Alternatively or additionally, the base surface and the lateral surfaces of the first housing element can have the same dimensions as the base surface and the lateral surfaces of the second housing element.

Both above-described forms of the housing elements have the advantage that the battery cells arranged in the housing can be compressed in two directions during the assembly since, in both cases, the housing is closed only by the two housing elements being connected to each other. Prior to this connection, in both cases a relatively large opening is available via which the battery cells can be reached.

For example, it is possible for both the first housing element and the second housing element to have an opening which, when said housing elements are connected to each other, is covered by the other housing element in each case. The opening can be arranged in relation to the base surface, for example between the two lateral surfaces.

According to one embodiment of the invention, the lateral surfaces can extend away in the same direction from the base surface. This is particularly advantageous so that the housing elements can cover the opening of the respective other housing element.

According to one embodiment of the invention, the first housing element can project into the second housing element in an overlapping region. The overlapping region can comprise more than half, preferably more than three quarters, of the lateral surfaces of the second housing element and more than half, preferably more than three quarters, of the lateral surfaces of the first housing element. This embodiment is particularly advantageous since the overlapping region is relatively large and the housing elements can thus be connected to each other particularly well. In this case, the base surface can in each case cover the opening of the other housing element.

According to one embodiment of the invention, an adhesive film can be arranged in the overlapping region between the two housing elements, via which adhesive film the housing elements are adhesively bonded to each other. A particularly firm connection of the two housing elements to each other can thus be achieved.

According to one embodiment of the invention, the adhesive film can extend over more than half, preferably over more than three quarters, of the overlapping region.

According to one embodiment of the invention, the housing can comprise a third housing element. The third housing element can overlap both with a first of the lateral surfaces of the first housing element and also with a first of the lateral surfaces of the second housing element. An adhesive film can be arranged between the third housing element and the first housing element and between the third housing element and the second housing element. The third housing element can be connected to the first housing element and to the second housing element via the adhesive film. It is in particular possible for the third housing element to be directly in contact with the adhesive film. The same applies to the first and the second housing element.

This embodiment is particularly advantageous when the lateral surfaces and the base surface of the first and second housing element have the same dimensions. In this case, namely, none of the housing elements can be pushed into the other. The first and the second housing element can then be placed adjacent to each other, for example in an abutting manner or with a small gap in-between, such that the openings of the first and the second housing element are adjacent to each other. The housing can then be completely closed with the third housing element, and the first housing element connected to the second housing element. It is also possible for the third housing element to cover the gap between the first and the second housing element.

According to one embodiment of the invention, the housing can comprise a fourth housing element. The fourth housing element can overlap both with a second of the lateral surfaces of the first housing element and also with a second of the lateral surfaces of the second housing element. An adhesive film can be arranged between the fourth housing element and the first housing element and between the fourth housing element and the second housing element. The fourth housing element can be adhesively bonded to the first housing element and to the second housing element via the adhesive film.

The fourth housing element can be used, for example, to connect the first housing element to the second housing element. In addition, the fourth housing element can cover a gap between the first and the second housing element. The fourth housing element can be arranged in particular on the lateral surfaces of the first and the second housing element, which lateral surfaces are arranged opposite the lateral surfaces on which the third housing element is arranged.

According to one embodiment of the invention, the housing can comprise two side walls which are each encompassed by the first and by the second housing element. Within the scope of this description, this is understood as meaning in particular that the side walls are arranged on the inner sides of the housing elements. The side walls can be arranged on in each case one of the lateral surfaces of the first and the second housing element. The side walls can in each case cover a gap between the first and the second housing element. This can be in particular a gap between the lateral surfaces of the first and the second housing element. The side walls can extend here, for example, parallel to the lateral surfaces of the first and the second housing element. It is in particular possible for the side walls to be adhesively bonded to the lateral surfaces of the first and the second housing element.

According to one embodiment of the invention, the side walls can be arched inward. Within the scope of this description, this is understood as meaning in particular that the side walls have a curvature which is directed away from the lateral surfaces on which the respective side wall is arranged. This curvature is particularly advantageous if pouch cells are arranged between the battery cells in the housing. Said pouch cells can have a prestress because of the compression during the assembly. The curvature of the side walls then makes it possible to reduce the expansion of the first and the second housing element, which expansion would arise without said curvature because of the prestress.

The motor vehicle comprises a battery according to one embodiment of the invention and an electric drive. The electric drive is electrically connected to the battery cells. In addition, the electric drive is designed to convert the electrical energy from the battery cells into mechanical work.

It is also possible for the lateral surfaces of the first and/or the second housing element to have an inwardly directed curvature. This curvature can be directed, for example, toward the respective other lateral surface of the same housing element. This curvature also reduces an expansion of the first and/or the second housing element due to the prestress of the pouch cells.

BRIEF DESCRIPTION OF THE DRAWING FIGURES

Further features and advantages of the present invention will become clear on the basis of the description below of preferred exemplary embodiments with reference to the attached figures. The same reference signs are used here for identical or similar components and for components with identical or similar functions. In the figures FIG. 1A shows a schematic sectional view of a first and a second housing element according to one embodiment of the invention;

DETAILED DESCRIPTION OF THE INVENTION

Figure 1A:
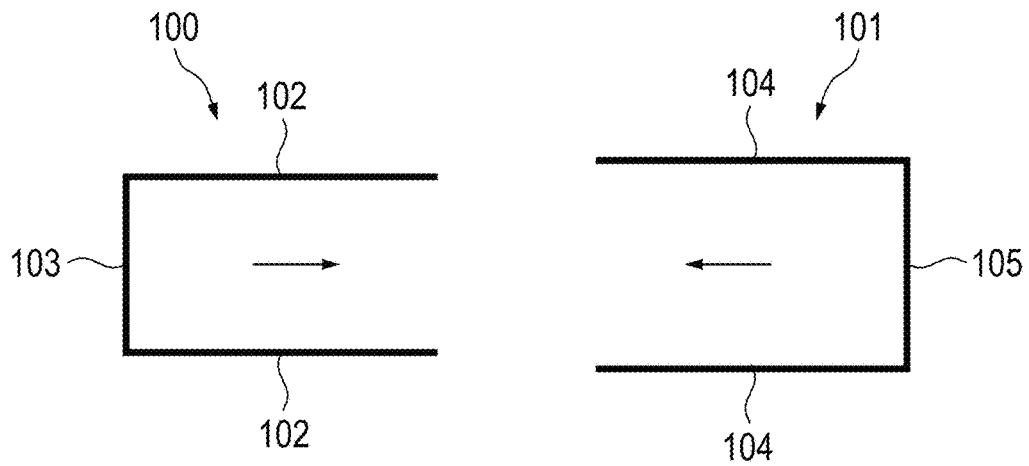
FIG. 1B shows a schematic sectional view of the first and the second housing element from FIG. 1A when said housing elements are connected to each other.

FIG. 1A illustrates a first housing element 100 and a second housing element 101. The first housing element 100 comprises two lateral surfaces 102 and a base surface 103. The lateral surfaces 102 extend parallel to each other in the same direction away from the base surface 103. In addition, the lateral surfaces 102 are arranged at mutually opposite ends of the base surface 103.

The second housing element 101 comprises two lateral surfaces 104 and a base surface 105. The lateral surfaces 104 extend parallel to each other in the same direction away from the base surface 105. In addition, the lateral surfaces 104 are arranged at mutually opposite ends of the base surface 105.

The second housing element 101 differs from the first housing element 100 in particular in that the distance of the lateral surfaces 104 of the second housing element 101 from each other is greater than the distance of the lateral surfaces 102 of the first housing element 100 from each other. This enables the first housing element 100 to be pushed into the second housing element 101. This is illustrated in FIG. 1A by two arrows.

In the cross-sectional view in FIG. 1A, the two housing elements 100 and 101 have approximately a U shape since the distance of the two lateral surfaces 102 or 104 from each other is in each case smaller than the length of the lateral surfaces 102 or 104.

Figure 1B:
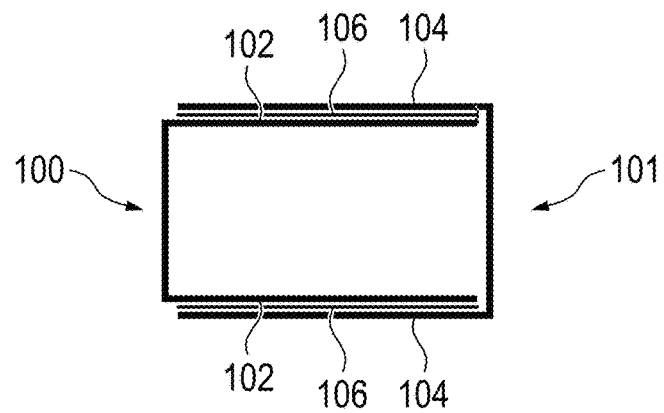

In FIG. 1B, the first housing element 100 is pushed into the second housing element 101. In this state, the base surfaces 103 and 105 cover an opening in the respective other housing element 101 or 100, thus producing a closed housing, in the interior of which battery cells can be arranged. The lateral surfaces 102 and 104 of the two housing elements 100 and 101 are firmly connected to each other in each case by an adhesive film 106. The adhesive film 106 extends over more than three quarters of the region in which the lateral surfaces 102 and 104 overlap.

During the assembly, the battery cells can be arranged, for example, in the first housing element 100. They can be compressed particularly well there from two sides. The first housing element 100 can subsequently be pushed into the second housing element 102 and adhesively bonded thereto.

Figure 2:
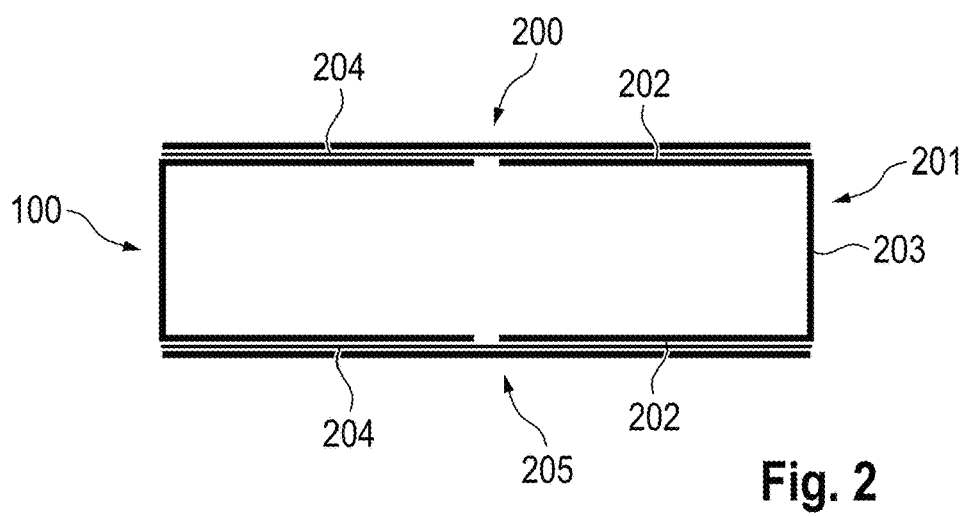
FIG. 2 shows a schematic sectional view of a housing with a first, a second and a third housing element according to one embodiment of the invention.

In FIG. 2, the lateral surfaces 202 of the second housing element 201 are at the same distance from each other as the lateral surfaces 102 of the first housing element 100. The first and the second housing element 100 and 201 can thus be arranged with their openings adjacent to each other. The openings are arranged here between the lateral surfaces 102 or 202 opposite the base surface 103 or 203. The lateral surfaces 102 of the first housing element 100 are arranged here in an abutting manner with respect to the lateral surfaces 202 of the second housing element 201.

The first housing element 100 is firmly connected to the second housing element 201 via adhesive films 204. An adhesive film 204 is arranged in each case on one of the lateral surfaces 102 and 202. The adhesive film 204 is also used to connect the first housing element 100 and the second housing element 201 to a third housing element 200. The third housing element 200 is approximately the same length as the sum of the length of the two lateral surfaces 102 and 202 to which it is connected via the adhesive film 204. The third housing element 200 covers a gap between the first housing element 100 and the second housing element 201.

In addition, the embodiment in FIG. 2 also has a fourth housing element 205 which is designed precisely in the manner of the third housing element 200 and likewise covers a gap between the first housing element 100 and the second housing element 201. The fourth housing element 205 is firmly connected to the first housing element 100 and to the second housing element 201 likewise via an adhesive film.

The assembly can be undertaken similar to the embodiment in FIG. 1B. However, it is not possible to push the first housing element 100 into the second housing element 201 since the two lateral surfaces 202 are at the same lateral distance from each other as the two lateral surfaces 102. Therefore, after the compression of the battery cells, the second housing element 201 is arranged next to the first housing element 100. The first housing element 100 and the second housing element 201 are subsequently firmly connected to the third housing element 200 and to the fourth housing element 205 via the adhesive films 204.

Figure 3:
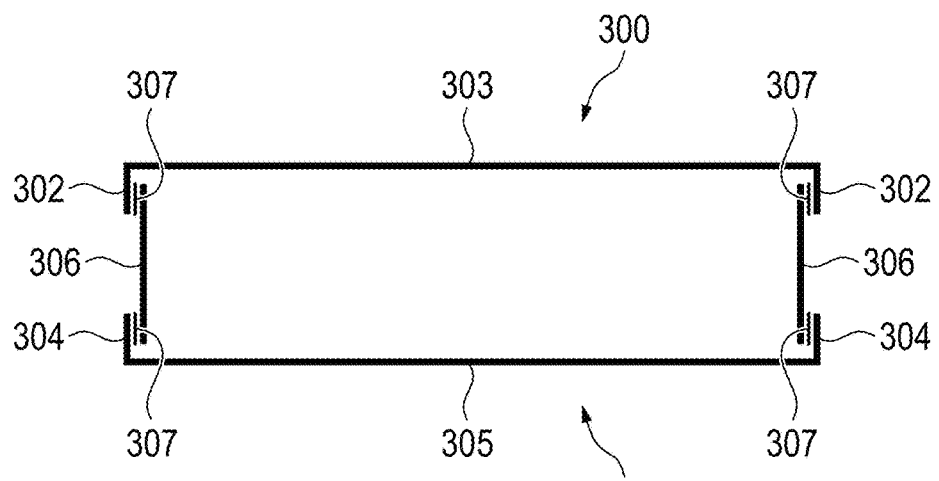
FIG. 3 shows a schematic sectional view of a housing according to one embodiment of the invention with side walls.

The embodiment in FIG. 3 comprises a first housing element 300 and a second housing element 301. The first housing element 300 comprises a base surface 303 and two lateral surfaces 302. The distance of the lateral surfaces 302 from each other is greater here than their length. The second housing element 301 comprises a base surface 305 and two lateral surfaces 304. The distance of the lateral surfaces 304 from each other is greater than their length. The lateral surfaces 304 of the second housing element 301 are at the same distance from each other as the lateral surfaces 302 of the first housing element 300.

The lateral surfaces 302 and 304 are in each case connected to side walls 306 via an adhesive film 307. The side walls 306 are arranged on the inner sides of the lateral surfaces 302 and 304 and cover a gap between the first housing element 300 and the second housing element 301.

During the assembly, the battery cells can also be compressed again from two sides while they are arranged in the or on the first housing element 300. The side walls 306 and the second housing element 301 are subsequently connected to the first housing element 300 via the adhesive films 307.

Figure 4:
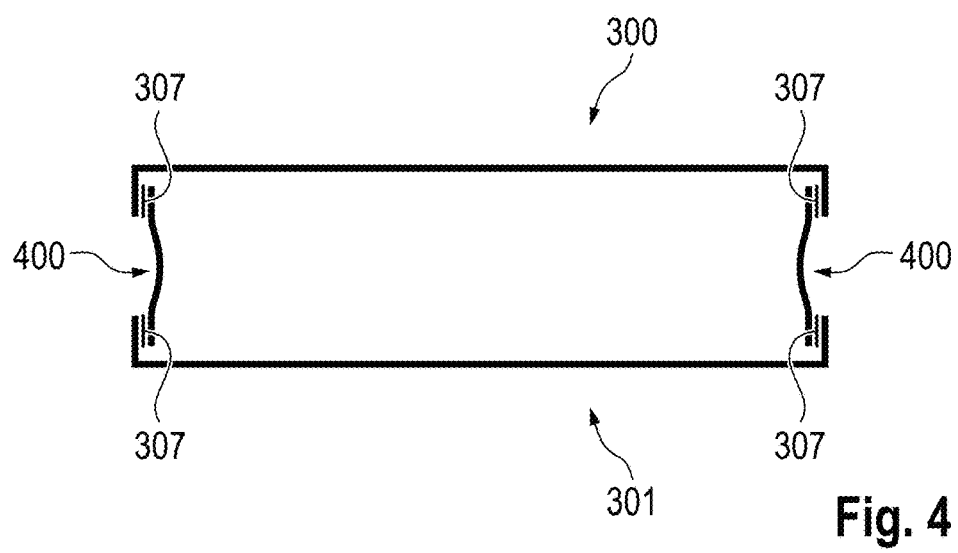
FIG. 4 shows a schematic sectional view of a housing according to one embodiment of the invention with curved side walls.

The embodiment in FIG. 4 differs from the embodiment in FIG. 3 in particular in that the side walls 400 have an inwardly directed curvature. Owing to this curvature, the expansion of the housing due to the prestress of the pouch cells that are arranged in some circumstances in the housing is reduced.

Figure 5:
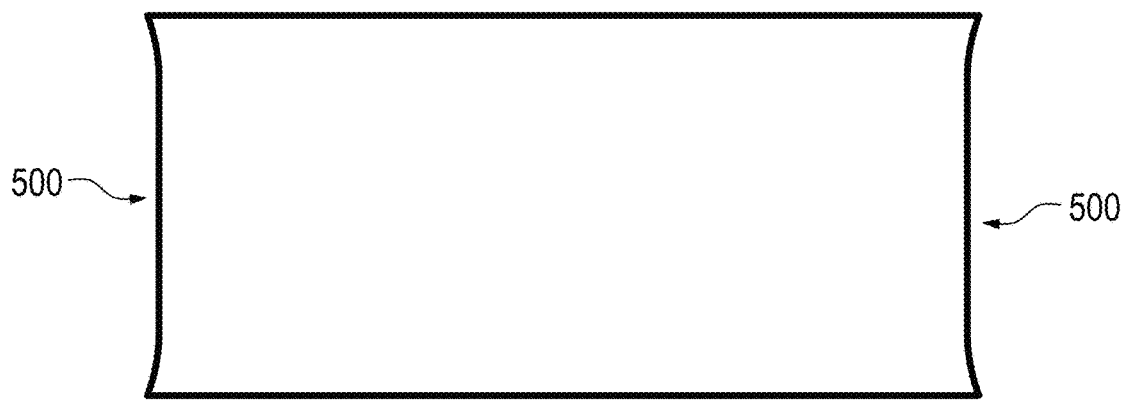
FIG. 5 shows a schematic top view of a housing element with curved lateral surfaces.

FIG. 5 is an enlarged illustration of lateral surfaces 500 of a first or second housing element (not illustrated specifically). The lateral surfaces 500 have an inwardly directed curvature. Owing to this curvature, the expansion of the housing due to the prestress of the pouch cells that are arranged in some circumstances in the housing is reduced.

What is claimed:

1. A battery for a motor vehicle, comprising:
   a plurality of battery cells and a housing, wherein the battery cells are arranged within the housing and configured for storing energy and discharging electrical energy,
   wherein the housing comprises at least a first housing element and a second housing element, wherein the first housing element and the second housing element are fixedly connected to each other, wherein the first housing element and the second housing element each comprise a base surface and two lateral surfaces extending from the base surface,
   wherein, for each housing element, the base surface is arranged between the lateral surfaces to define an interior region of the housing element,
   wherein, for each housing element, a first distance by which the lateral surfaces extend away from the base surface is greater than a second distance by which the lateral surfaces are spaced apart from each other,
   wherein the two lateral surfaces of the second housing element are at a larger distance from each other than the distance between the two lateral surfaces of the first housing element,
   wherein the first housing element is nested inside of the second housing element,
   wherein the base surface of the first housing element extends outside of the interior region of the second housing element, while the two lateral surfaces of the first housing element extend inside the interior region of the second housing element, and
   wherein the two lateral surfaces of the first housing element and the second housing element are bonded to each other via an adhesive film.

2. The battery as claimed in claim 1, wherein the lateral surfaces extend away in a same direction from the base surface.

3. The battery as claimed in claim 1, wherein the first housing element projects into the second housing element in an overlapping region, wherein the overlapping region comprises more than half of the lateral surfaces of the second housing element and more than half of the lateral surfaces of the first housing element.

4. The battery as claimed in claim 3, wherein the adhesive film is arranged in the overlapping region between the first housing element and the second housing element.

5. The battery as claimed in claim 4, wherein the adhesive film extends over more than half of the overlapping region.

6. A battery for a motor vehicle, comprising:
   a plurality of battery cells and a housing, wherein the battery cells are arranged within the housing and configured for storing energy and discharging electrical energy,
   wherein the housing comprises at least a first housing element and a second housing element, wherein the first housing element and the second housing element each comprise a base surface and two lateral surfaces extending from the base surface,
   wherein, for each housing element, the base surface is arranged between the lateral surfaces to define an interior region of the housing element,
   wherein the first housing element is positioned outside of the interior region of the second housing element and the second housing element is positioned outside of the interior region of the first housing element, wherein the base surface and the lateral surfaces of the first housing element have the same dimensions as the base surface and the lateral surfaces of the second housing element, wherein the housing further comprises a third housing element that overlaps both with a first of the lateral surfaces of the first housing element and also with a first of the lateral surfaces of the second housing element, and wherein an adhesive film is arranged between the third housing element and the first housing element and between the third housing element and the second housing element, wherein the third housing element is adhesively bonded to the first housing element and to the second housing element via the adhesive film.

7. The battery as claimed in claim 6, wherein the housing comprises a fourth housing element that overlaps both with a second of the lateral surfaces of the first housing element and also with a second of the lateral surfaces of the second housing element, and wherein another adhesive film is arranged between the fourth housing element and the first housing element and between the fourth housing element and the second housing element, wherein the fourth housing element is adhesively bonded to the first housing element and to the second housing element via the another adhesive film.

8. A battery for a motor vehicle, comprising:
a plurality of battery cells and a housing, wherein the battery cells are arranged within the housing and configured for storing energy and discharging electrical energy,
wherein the housing comprises at least a first housing element and a second housing element, wherein the first housing element and the second housing element each comprise a base surface and two lateral surfaces extending from the base surface,
wherein, for each housing element, the base surface is arranged between the lateral surfaces to define an interior region of the housing element,
wherein the first housing element is positioned outside of the interior region of the second housing element and the second housing element is positioned outside of the interior region of the first housing element,
wherein the base surface and the lateral surfaces of the first housing element have the same dimensions as the base surface and the lateral surfaces of the second housing element,
wherein the housing further comprises two side walls separate from the first and second housing elements, which are arranged, in each case, on one of the lateral surfaces of the first housing element and of the second housing element, wherein the side walls each cover a gap between the first housing element and the second housing element,
wherein the housing further comprises adhesive films arranged, in each case, on said one of the lateral surfaces of the first housing element and of the second housing element.

9. The battery as claimed in claim 8, wherein the side walls are curved inward.

10. A motor vehicle comprising the battery as claimed in claim 1 and an electric drive, wherein the electric drive is electrically connected to the battery cells, and wherein the electric drive is configured to convert the electrical energy into mechanical work.

11. The battery as claimed in claim 6, wherein, for each housing element, a first distance by which the lateral surfaces extend away from the base surface is greater than a second distance by which the lateral surfaces are spaced apart from each other.

12. The battery as claimed in claim 1, wherein a length of the base surface of the second housing element is larger than a length of the base surface of the first housing element.

13. The battery as claimed in claim 6, wherein said first of the lateral surfaces of the first housing element and said first of the lateral surfaces of the second housing element are exterior facing surfaces.

14. The battery as claimed in claim 8, wherein the side walls span a gap between the first and second housing elements.

15. The battery as claimed in claim 8, wherein a length of the base surface is greater than a length of each lateral surface.

16. The battery as claimed in claim 8, wherein said one of the lateral surfaces of the first housing element and of the second housing element are interior facing surfaces.

17. The battery as claimed in claim 1, wherein each of the two lateral surfaces of the first housing element and the second housing element extends from a mutually opposite end of a respective base surface of the first housing element and the second housing element.

18. The battery as claimed in claim 1, wherein the two lateral surfaces of the first housing element are parallel to the two lateral surfaces of the second housing element.

19. The battery as claimed in claim 1, wherein each of the first housing element and the second housing element comprises an opening arranged opposite to the base surface and between the two lateral surfaces, and wherein base surfaces of the first housing element and the second housing element are configured to cover the opening.

20. The battery as claimed in claim 1, wherein the first housing element projects into the second housing element in an overlapping region, wherein the overlapping region comprises more than more than three quarters of the lateral surfaces of the second housing element and more than more than three quarters of the lateral surfaces of the first housing element.

21. The battery as claimed in claim 6, wherein the third housing element covers a gap between the first and second housing elements.

22. The battery as claimed in claim 7, wherein the fourth housing element covers a gap between the first and second housing elements.

* * * * *